(12) United States Patent
Bosquet et al.

(10) Patent No.: US 8,998,098 B2
(45) Date of Patent: Apr. 7, 2015

(54) MICROCIRCUIT CARD AND A TOOL AND METHOD FOR MAKING THEREOF

(75) Inventors: Olivier Bosquet, Nanterre (FR); Mickael Huet, Nanterre (FR)

(73) Assignee: Oberthur Technologies, Colombes (FR)

( * ) Notice: Subject to any disclaimer, the term of this patent is extended or adjusted under 35 U.S.C. 154(b) by 0 days.

(21) Appl. No.: 13/605,579

(22) Filed: Sep. 6, 2012

(65) Prior Publication Data

US 2013/0068844 A1    Mar. 21, 2013

(30) Foreign Application Priority Data

Sep. 12, 2011 (EP) .................................. 11306135

(51) Int. Cl.
*G06K 7/08* (2006.01)
*G06K 19/06* (2006.01)
*G06K 19/077* (2006.01)
*G06K 7/00* (2006.01)

(52) U.S. Cl.
CPC ........ *G06K 19/07743* (2013.01); *G06K 7/0021* (2013.01)

(58) Field of Classification Search
USPC .......... 235/375, 380, 451, 488, 492, 486, 489
See application file for complete search history.

(56) References Cited

U.S. PATENT DOCUMENTS

| | | | |
|---|---|---|---|
| 5,581,065 A * | 12/1996 | Nishikawa et al. | 235/492 |
| 5,818,030 A | 10/1998 | Reyes | |
| 5,936,227 A | 8/1999 | Trüggelmann et al. | |
| 6,193,163 B1 * | 2/2001 | Fehrman et al. | 235/488 |
| 6,320,751 B2 * | 11/2001 | Takeda et al. | 361/737 |
| 6,448,638 B1 * | 9/2002 | Fidalgo et al. | 257/679 |
| 7,183,636 B1 * | 2/2007 | Boccia et al. | 257/679 |
| 7,264,172 B2 * | 9/2007 | Amiot et al. | 235/486 |
| 7,871,007 B2 | 1/2011 | Amiot et al. | |
| 2002/0023963 A1 | 2/2002 | Luu | |
| 2004/0211843 A1 * | 10/2004 | Boker | 235/492 |
| 2005/0230485 A1 * | 10/2005 | Ross et al. | 235/492 |
| 2005/0231921 A1 | 10/2005 | Noda et al. | |
| 2006/0011731 A1 | 1/2006 | Anders et al. | |
| 2006/0187805 A1 * | 8/2006 | Lind et al. | 369/273 |
| 2007/0108294 A1 | 5/2007 | Rossiter | |

(Continued)

FOREIGN PATENT DOCUMENTS

DE    298 19 389 U1    1/1999
DE    19737565 A1    3/1999

(Continued)

OTHER PUBLICATIONS

NN630819—IBM Technical Disclosure Bulletin, Aug. 1963, US; vol. 6.*
Partial European Search Report from European App. No. 11 30 6135 dated Jan. 2, 2012.
European Search Report from European App. No. 11 30 6135.

*Primary Examiner* — Tuyen K Vo
(74) *Attorney, Agent, or Firm* — Arent Fox LLP

(57) ABSTRACT

A microcircuit card (2) and held within a carrier card (3) is generally shown as 1 in FIG. 1. The microcircuit card (2) is bounded on all edges except one edge (10a) which is free. The free edge (10a) is substantially in alignment with an edge (7) of a carrier card (3). The microcircuit card and carrier card are held together by connections (12), which can be broken to release the microcircuit card (20) so it can be used independently of the carrier card. The position of the microcircuit card allows it to be easily and cleanly removed from the carrier card.

12 Claims, 2 Drawing Sheets

(56) References Cited

U.S. PATENT DOCUMENTS

| | | | |
|---|---|---|---|
| 2008/0083831 A1* | 4/2008 | Perez Lafuente et al. | 235/492 |
| 2009/0040695 A1* | 2/2009 | Fidalgo et al. | 361/679.31 |
| 2011/0163168 A1 | 7/2011 | Gallo | |
| 2011/0182040 A1* | 7/2011 | Ellul et al. | 361/737 |
| 2011/0240825 A1* | 10/2011 | Bosquet et al. | 248/548 |
| 2012/0048948 A1* | 3/2012 | Bertin et al. | 235/492 |

FOREIGN PATENT DOCUMENTS

| | | |
|---|---|---|
| DE | 19943092 A1 | 3/2001 |
| EP | 0535436 A2 | 4/1993 |
| FR | 2 817 063 A1 | 5/2002 |
| FR | 2817063 A1 | 5/2002 |

* cited by examiner

MICROCIRCUIT CARD AND A TOOL AND METHOD FOR MAKING THEREOF

FIELD OF THE INVENTION

The present invention relates to a microcircuit card and in particular but not exclusively to a microcircuit card that is in the form of a card that can be detached from a carrier card. The invention further relates to a method and tool and method for making such a microcircuit and carrier card.

BACKGROUND OF THE INVENTION

Microcircuit cards which are also known as microchip or SIM cards are of a size and shape that is generally defined by industry standards. Typically the standard formats used are ID-000 formats which are used mainly for mobile telephone operator subscriber identification cards, known as SIM (Subscriber Identification Module) cards or plug in SIM cards in the case, for example, of USIM (Universal Subscriber Identification Module) cards. Other formats used are ID-1 format cards (derived from ISO Standard 7810) which are used for bank cards and credit cards, for example.

The manufacturing costs of ID-000 cards are usually much lower than for ID-1 format cards as there is less material that is used to make the card and less area to be printed on. However, ID-000 cards are very small, especially if they are to be inserted into a mobile communication device such as a mobile telephone. This means that the handling of ID-000 cards per se can be difficult. As a consequence, ID-000 cards are often incorporated in a carrier card which is generally of the size and shape of an ID-1 card, which are designed to be routinely handled by individuals and so they provide a good supporting carrier body for ID-000 cards. When there is a card which is comprised of a SIM card of an ID-000 format where the microcircuit card is precut into an ID-1 format card body, a user can either use the ID-1 card by inserting it into a reader or the ID-000 format microcircuit card can be removed from the carrier ID-1 card body and inserted into a mobile device, for example, a mobile telephone.

Currently a SIM card is incorporated in within the body of a support card, for example the periphery of the ID-000 card is bounded by the carrier card. This provides a secure construct for supporting the card. However, as the card is bounded on all four sides, it can be sometimes difficult to remove the ID-000 card from the carrier, especially as the ID-000 card is itself small and needs careful handling.

Carrier cards have been made where there are lines of weakness surrounding the ID-000 card, for example as described in US2007/0108294 where there carrier card is formed in several parts joined together, but again the ID-000 card is bordered by the parts that make up the carrier card and so there is still the difficulty of cleanly removing the ID-000 card from the ID-1 card.

The present invention seeks to overcome the problems associated with the prior art by providing a microcircuit card that can be easily and cleanly detached from a carrier card. Furthermore the invention seeks to provide a microcircuit card and carrier that is easy to manufacture using a novel tool to make the card and carrier.

SUMMARY OF THE INVENTION

According to a first aspect of the invention there is provided a microcircuit card attached to a carrier card, said microcircuit card having being delineated from a surface forming said carrier card and being releasably attached to sad carrier by releasable connections, characterized in that the microcircuit card is positioned such that at least one edge of said microcircuit card is positioned to be at an edge of said carrier card.

Preferably the releasable connections are friable connections that allow the microcircuit card to be detached from the carrier card.

It is preferred that the microcircuit card is bounded by the carrier card except for one edge which is aligned with an edge of the carrier card.

Preferably the microcircuit card is of a substantially rectilinear shape with there being two longer edges to the microcircuit card and two shorter edges of said microcircuit card with one shorter edge of the microcircuit card being aligned at an edge of the carrier card. However it is envisaged that other shapes may be used with the shape being such that an edge of the microcircuit card can align an edge of the carrier card.

It is envisaged that the corners of the rectangular shaped card are rounded.

Preferably there is a space between the end wall of the rectangular card and the carrier card, said end wall being at the edge of the microcircuit card that is opposed to the edge of the microcircuit card that is aligned with the edge of the carrier card.

It is preferred that the longer edges of the rectangular card are attached to the carrier card by lines of weakness that extend substantially the whole length of the longer edges of the rectangular microcircuit card.

It is envisaged that a front face of the microcircuit card is in the same plane a front face of the carrier card.

It is preferred that the rear face of the microcircuit card is recessed with respect to a rear face of the carrier card.

Preferably the carrier card and microcircuit card of a plastic material, in particular a plastic laminate. However the card and/or carrier may be made of other materials such as a paper composite or one may be of paper and the other of plastic.

According to second aspect of the invention there is provided a method of making a microcircuit card and carrier card, said method comprising placing a carrier card on a support with a face of said carrier card being positioned on said support, and milling a peripheral edge for the microcircuit card in the carrier card, characterized in that the milling is such that an edge of the microcircuit card is aligned with an edge of the carrier card. The milling may be by using a tool that is programmed to define the edge of the microcircuit card, for example a computer guided cutting tool or the peripheral edge may be milled.

In particular the method involves placing a carrier card on a support (preferably a front face) of said carrier card being positioned on said support, placing a milling mask over a second face (preferably a rear face) of said card and milling around at least part of the periphery of said milling mask, characterized in that the milling mask has an opening at one edge, said opening being arranged to align with an edge of the carrier card such that on milling the rear face of the card the milling tool can be positioned beyond the edge of the microcircuit card so that it can mill an edge that aligns with the edge of the carrier card. As well as milling there may be stamping of the card to form a cut out edge, for example the shorted edge of the microcircuit card (when rectangular) that is distant from the edge of the microcircuit card that aligns with the carrier card.

Preferably the support is rectilinear. The support is generally of the same shape as the card to be cut so that when pressure is placed on the card during milling, the pressure is evenly distributed across the plane of the card so that the milling depth is kept to an even depth around the card where required.

It is envisaged that the milling mask is clamped to the carrier card leaving one edge of the carrier card unclamped.

Preferably the milling tool has a head having a beveled edge so that the beveled edge routs the rear of the carrier card in areas that are not hidden by the milling mask.

It is envisaged that the milling mask has an open section allowing the milling tool to extend beyond the area of the card that is masked so that the routing or cutting into the card carrier card surface to form at least part of the outline of the microcircuit card can extend to the edge of the carrier card so that an end or edge wall of the microcircuit card can be substantially in alignment with the edge wall of the carrier card.

According to a third embodiment of the invention there is provided a milling tool for use in a method according to a second aspect of the invention, said milling tool including a cutting area towards an end of said milling tool, said cutting area having a toothed surface that can cut into material forming the surface of a carrier card to create at least part of the periphery of a microcircuit in said carrier card.

Preferably the toothed surface is provided by a portion of the end of the milling tool being cut away to form the toothed cutting surface.

It is envisaged that the toothed surface is formed by a substantially v shape being cut into the side end wall of the milling tool to provide a cutting face and a recess so that swarf from the cutting process can be received by the recess.

BRIEF DESCRIPTION OF THE FIGURES

An embodiment of the invention will be described with reference to and as illustrated in the accompanying figures by way of example only, in which.

DETAILED DESCRIPTION OF EMBODIMENTS OF THE INVENTION

Figure 1:
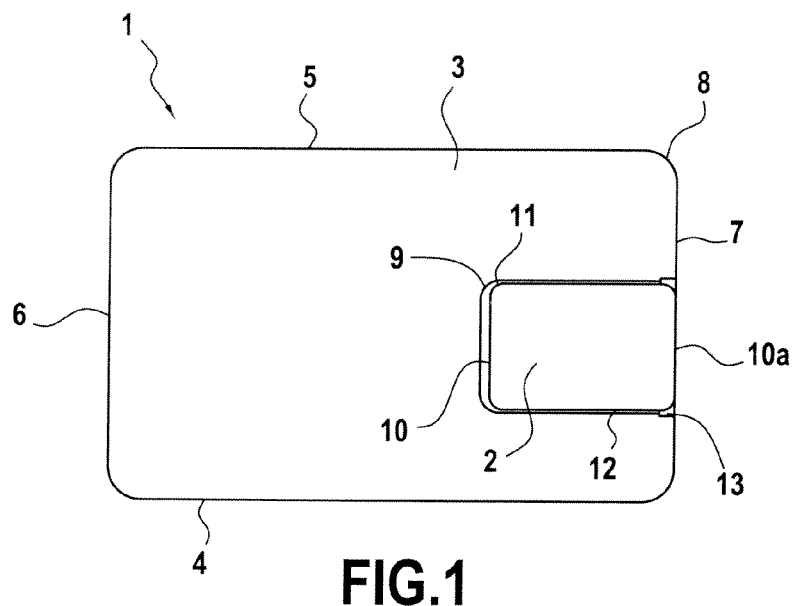
FIG. 1 shows: a front view of a microcircuit card in position in a carrier card according to an embodiment of the invention.

FIG. 1 shows a carrier card and microcircuit card according to an embodiment of the invention. The combined carrier card and microcircuit card is generally shown as 1 in the figure with the microcircuit card being shown as smaller card 2 within the larger carrier card 3. The carrier card is shown as being of the ID-1 format for cards, which is a rectangular card with the dimensions of approximately 85.60 mm×53.98 mm×0.76 mm. The card is generally rectangular with two longer sides 4 and 5 and two shorter sides 6, 7. The corners of the carrier card 8 are rounded and the microcircuit card 2 mirrors the general shape of the carrier card but it is of smaller dimensions and is generally of the ID-000 format with the dimensions of 25 mm×15 mm. Again the microcircuit card has rounded corners 9.

The shorter end of the microcircuit card 10 which is positioned towards the core/centre of the carrier card has a space 11 between the end of the microcircuit card and the carrier card. Along the longer sides of the microcircuit card 2 there are lines of weakness 12 which form a frangible connection between the microcircuit card and the carrier card. The lines of weakness may be made by having a series of spaced holes or apertures between the two cards or there may be a score line between the two. Where the ends of the lines of weakness 12 on the longer edges of the microcircuit card meet the edge 8 of the carrier card there are gaps 13 between the edge 10a of the microcircuit card 2 and the aligned edge 7 of the carrier card. This means there is a clear space between the rounded corner of the microcircuit card and the carrier card which creates an area that allows the microcircuit card to be moved either by a back and forth movement or with a slight twisting movement to weaken the connection between the microcircuit card and the carrier card so the microcircuit card can be removed or what is called de-plugged from the carrier card so it can be used independently from the carrier card, for example as a SIM card. The fact that there is spacing 11 at the end 10 of the microcircuit card as well as the space 13 at the opposed corners of the microcircuit card allows for removal of the microcircuit card without creating burrs or uneven edges on the microcircuit card. Uneven edges may affect the ease or accuracy of insertion of the microcircuit card in an electronic device, which often have tight margins for the fitting of a SIM card so that connectors in the device accurately align with the circuitry on the microcircuit device. Furthermore by limiting the areas of attachment of the microcircuit card 2 and the carrier card 3 to just the two defined areas of weakness along the longer sides of the microcircuit device means that a twisting force can be more easily applied to remove the microcircuit card thereby making it easier to de-plug the microcircuit card.

Figure 2:
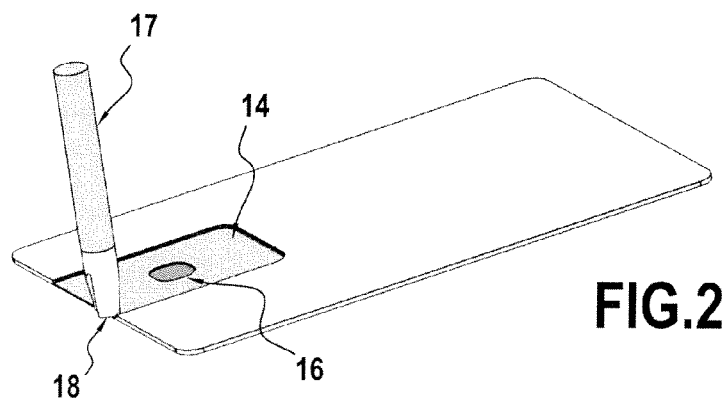
FIG. 2 shows: a rear view of the outline of a microcircuit card being cut into a carrier card.

Looking at FIG. 2, a milling mask (shown as 15 in FIG. 4) which covers the carrier card 3 is positioned over the carrier card. Generally the cutting of the card is at the rear of the card so that the aesthetic look of the front of the card is not compromised. Underneath the area of the card that is to be the microcircuit card a support 14 is positioned and the card may be secured in place using a locator 16 which may be a physical locator or it may be that suction is applied at the locator to minimize movement of the card during cutting. A tool 17 having a cutting head traces the outline of the part of the card having the microcircuit using the milling mask that acts as a guide. The milling may be around the whole periphery of the card and the mask may be used also to with a stamp that stamps out the gap 11 between end wall 10 of the microcircuit card and the carrier card as shown in FIG. 1 or the card may even be pre-stamped with the gap and the milling tool cuts the lines of weakness 12 so they extend from the ends of the gap 11 towards the edge 7 of the carrier card.

Figure 3:
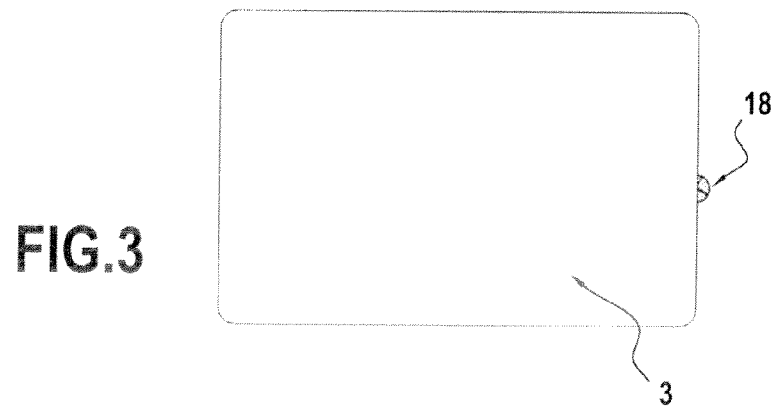
FIG. 3 shows: a front view of the carrier card with the tool for cutting out an outline of the microcircuit card being visible.

FIG. 3 shows that the milling tool head 18 extends beyond the profile of the milling mask 15 so that the end 10a of the microcircuit card can be formed so it aligns with the end 7 of the carrier card.

Figure 4A:
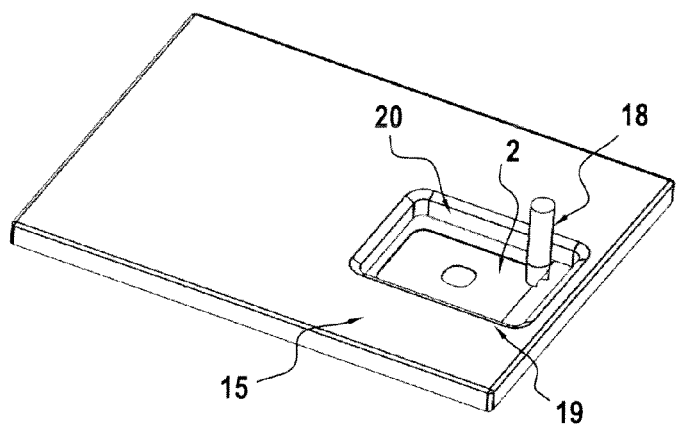
FIG. 4a shows: the cutting of the outline of a microcircuit card with a milling mask being in situ.

FIG. 4a shows a milling mask according to an embodiment of the invention, in more detail. The milling mask generally shown as 15 substantially covers the carrier card. There is an opening in the mask which shows the top of the card which would be supported by a support/anvil (shown as 14 in FIG. 4b). The support/anvil in effect is under the area of the card that is to form the microcircuit card 2. There is an opening 19 where there is no clamping of the card 3 by the milling mask 15 against the support and this reveals the area to form the microcircuit card 2 out of the carrier card 3. This space allows the milling tool 18 to pass along the edge of the microcircuit card 2 so that milling or finishing off the edge 10a of the microcircuit card can occur. The sides 20 of the milling mask may be straight edged or in some situations there may be stepped so that different sized microcircuit cards 2 can be cut. The card will rest on the step and the anvil can be pushed upwards to support the card. In addition the sides 20 of the milling mask may have visual indicators to show the depth of milling, which may be numerical or coloured indicators.

Figure 4B:
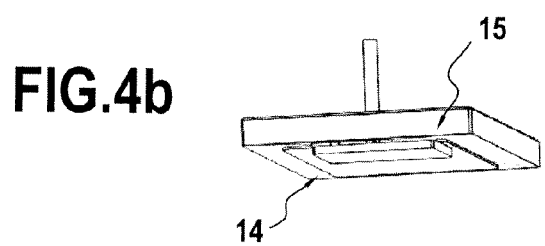
FIG. 4b shows: the relative relationship of the milling mask and the card support.

FIG. 4b shows the relative positioning of the milling mask 15 and the support/anvil and how they are positioned either side of the card to be milled to form a plug card.

Figure 5:
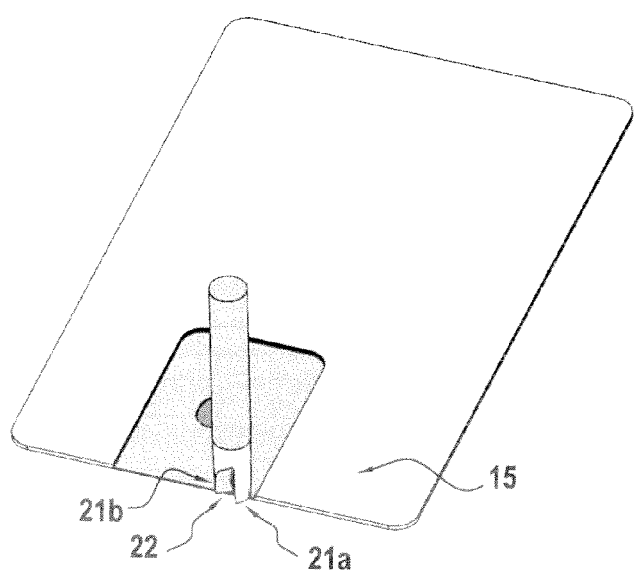
FIG. 5 shows: a closer view of the milling tool used according to an embodiment of the invention.

The tool used for milling is shown in FIG. 5. The tool comprises a shaft having a head which has a cut out 22. The cut out is generally V shaped and as a result the head has in effect two toothed areas 21a and 21b. This means that the milling may be done in either direction. The cut out 22 allows also for any swarf formed from the cutting process to fall away from the cutting surface and helps to prevent clogging of the toothed areas 21a or 21b during cutting.

The invention allows for the production of accurately cut microcircuit cards which are also easier to remove from carrier cards. This is of great benefit when producing cards that have to be inserted accurately in readers or in electronic devices and has the added advantage that such accurately produced cards allows for the possibility of better electrical connections between the cards and the devices that they are inserted into due to better alignment.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described. Furthermore where individual embodiments are discussed, the invention is intended to cover combinations of those embodiments as well.

The invention claimed is:

1. An assembly comprising:
   a microcircuit card and a carrier card, said microcircuit card being delineated from a surface forming said carrier card and being releasably attached to said carrier card by lines of weakness,
   wherein the microcircuit card is positioned such that:
      a first edge of said microcircuit card is positioned to be at a first edge of said carrier card,
      there are gaps between the first edge of the microcircuit card and the first edge of the carrier card, and
      there is a space between a second edge of the microcircuit card and a second edge of the carrier card, said second edge of the microcircuit card being opposed to the first edge of the microcircuit card, and
   wherein a face of the microcircuit card is recessed with respect to a corresponding face of the carrier card.

2. The assembly according to claim 1 which is of a substantially rectilinear shape with there being two longer edges to the microcircuit card and two shorter edges of said microcircuit card with one of the shorter edges of the microcircuit card being positioned at the first edge of the carrier card.

3. The assembly according to claim 2 wherein the space is between an end wall of the rectilinear microcircuit card that extends towards the centre of the carrier card and which is opposed to the first edge of the microcircuit card that is positioned to be at the first edge of the carrier card.

4. The assembly according to claim 1 wherein the lines of weakness are friable connections that allow the microcircuit card to be removed from the carrier card.

5. The assembly according to claim 4, wherein the lines of weakness extend substantially along the length of the longer edges of the microcircuit card, the microcircuit card having a rectangular shape.

6. The assembly according to claim 1 wherein a front face of the microcircuit card is in the same plane as a front face of the carrier card.

7. The assembly according to claim 1 wherein a rear face of the microcircuit card is recessed with respect to a rear face of the carrier card.

8. A method of making an assembly having a microcircuit card attached to a carrier card, comprising:
   placing a carrier card on a support with a first face of said carrier card being positioned on said support;
   milling with a milling tool a peripheral edge for the microcircuit card in the carrier card, the milling tool moving beyond a first edge of the carrier card so that a first edge of the microcircuit card is alignable with the first edge of the carrier card, wherein the first edge of the microcircuit card is positioned to be at the first edge of the carrier card, and wherein the milling cuts lines of weakness to releasably attach the microcircuit card to the carrier card; and
   stamping out a space between a second edge of the microcircuit card and a second edge of the carrier card, said second edge of the microcircuit card being opposed to the first edge of the microcircuit card.

9. The method of making a microcircuit card according to claim 8, comprising placing a milling mask over a second face of said carrier card and milling along at least part of an outline of said milling mask with the milling tool to form the peripheral edge.

10. The method according to claim 8, wherein the support is rectilinear and the milling results in a rectilinear microcircuit card attached on three edges by the carrier card with a fourth edge being positioned at the first edge of the carrier card.

11. The method according to claim 9, wherein there is a space where the milling mask and the support are not clamped together so that the milling tool can extend to pass along and form a peripheral edge of the microcircuit card.

12. The method according to claim 9, wherein the milling tool routs the periphery of the microcircuit card.

* * * * *